US008146712B2

(12) United States Patent
Vincent et al.

(10) Patent No.: US 8,146,712 B2
(45) Date of Patent: Apr. 3, 2012

(54) COMPRESSOR LUBRICANT SYSTEM INCLUDING ACID FILTRATION

(75) Inventors: Thomas E. Vincent, Charlotte, NC (US); Paul A. Lombardozzi, Charlotte, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 1494 days.

(21) Appl. No.: 11/301,923

(22) Filed: Dec. 13, 2005

(65) Prior Publication Data
US 2006/0144641 A1 Jul. 6, 2006

Related U.S. Application Data

(60) Provisional application No. 60/635,504, filed on Dec. 13, 2004.

(51) Int. Cl.
*F01M 1/00* (2006.01)
(52) U.S. Cl. ..................................................... 184/6.16
(58) Field of Classification Search ................. 184/6.16, 184/6.13
See application file for complete search history.

(56) References Cited

U.S. PATENT DOCUMENTS

| 3,025,233 | A |   | 3/1962 | Figert |
|-----------|---|---|--------|--------|
| 4,460,547 | A | * | 7/1984 | Sameh et al. ................ 423/7 |
| 4,645,591 | A | * | 2/1987 | Gerulis ...................... 210/108 |
| 5,089,119 | A |   | 2/1992 | Day et al. |
| 5,318,151 | A | * | 6/1994 | Hood et al. .................. 184/6.1 |
| 5,435,170 | A | * | 7/1995 | Voelker et al. ............ 73/53.05 |
| 5,804,605 | A | * | 9/1998 | Palumbo ..................... 521/28 |
| 5,899,667 | A |   | 5/1999 | Greer |
| 7,674,099 | B2 | * | 3/2010 | Dunn ........................ 418/55.6 |

FOREIGN PATENT DOCUMENTS

EP 1128067 8/2001
WO WO2004/094831 11/2004

* cited by examiner

Primary Examiner — Michael R. Mansen
Assistant Examiner — Robert Reese
(74) Attorney, Agent, or Firm — Michael Best & Friedrich LLP

(57) ABSTRACT

A compressor system including a compressor airend having an inlet and an outlet and operable to discharge a mixed flow of fluid including a working fluid and a lubricant. A separator receives the mixed flow of fluid and discharges a primary flow of lubricant, a secondary flow of lubricant, and a flow of compressed working fluid. An acid filter includes a fluid inlet positioned to receive the secondary flow of lubricant.

10 Claims, 4 Drawing Sheets

COMPRESSOR LUBRICANT SYSTEM INCLUDING ACID FILTRATION

RELATED APPLICATIONS

This application claims the benefit under 35 U.S.C. §119 of U.S. Provisional Application No. 60/635,504, entitled COMPRESSOR LUBRICANT SYSTEM, filed on Dec. 13, 2004.

BACKGROUND

The present invention relates to a system for extending the useful life of compressor lubricants. More particularly, the present invention relates to an acid-filtered lubricant system for a compressor.

Most compressors are either contact cooled or oil-free. Contact cooled compressors are generally defined as compressors that inject a lubricant into the compression chamber to lubricate, remove the heat of compression, and seal the clearances between moving components such as compressor rotors, or the like. Oil-free compressors are generally defined as compressors that separate the air and oil systems, if required, to prevent contamination of the compressed air. In both cases, the air and lubricant must be cooled to remove the heat of compression and heat from friction.

In conventional air compressor systems which utilize a contact cooled compressor, air is compressed in a compression chamber or airend (by a set of rotary screws, for example). A lubricant, such as oil, is injected into the compression chamber and mixes with the compressed air. The lubricant is generally injected into the compression chamber for a number of reasons including cooling the air compressor system, lubricating bearings, balancing axial forces and sealing the moving parts. After compression, the lubricant must be removed from the stream of compressed air before the compressed air may be used downstream for pneumatic tools and/or other equipment or applications.

While many variations on the separation process have been explored, many compressor units today use a two step separation process. The heavily saturated air/lubricant mix discharged from the airend enters a separator tank and is mechanically separated by means of a centrifugal impingement process on the inside wall of the separator tank and through gravity. Alternatively, a system of baffles may be used to turn the flow one or more times in order to force the lubricant to separate by impingement on the baffles and/or wall of the separator. The separated lubricant (taken out of the air/lubricant mix) is deposited in the sump of the separator tank before being piped back through a main liquid cooler and finally re-injected back into the airend. The partially separated air that contains the remaining lubricant is then passed through a secondary separator filter where the air is "cleaned". The cleaned air passes through a minimum pressure check valve or the like and travels downstream to desired downstream components. The lubricant removed from the air within the separator filter drains to the bottom of the separator filter whereupon it is collected and returned to the airend.

SUMMARY

In some embodiments, the invention provides a compressor system including a fluid compressor airend having an inlet and a discharge. The compressor airend is operable to discharge a working fluid and lubricant mixture at a higher pressure from the discharge. A separator is in fluid communication with the discharge and is configured to separate lubricant from the working fluid and lubricant mixture. A flow divider is operable to direct a portion of the lubricant along a first flow path and the remainder of the lubricant along a second flow path. An acid filter is positioned along the second flow path. The acid filter includes a filter housing containing an acid-absorbing resin media.

In some embodiments, the invention provides a compressor system including a fluid compressor airend having an inlet and a discharge. The compressor airend is configured to receive a lubricant and a working fluid at a first pressure adjacent the inlet and to discharge a working fluid and lubricant mixture at a second pressure from the discharge. The second pressure is higher than the first pressure. A separator is in fluid communication with the discharge. The separator is configured to separate lubricant from the working fluid and lubricant mixture. A combination filter is in fluid communication with the separator and includes a particulate filter and an acid filter. The acid filter includes an acid-absorbing resin media configured to lower the total acid number of the lubricant traveling therethrough.

In some embodiments, the invention provides a compressor system including a compressor airend having an inlet and an outlet and operable to discharge a mixed flow of fluid including a working fluid and a lubricant. An oil cleaning system receives the mixed flow of fluid and is arranged to discharge a primary flow of lubricant, a secondary flow of lubricant, and a flow of compressed working fluid. An acid filter includes a fluid inlet positioned to receive the secondary flow of lubricant.

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Applicants have found that lubricant/coolant performance in contact cooled air compressors is significantly reduced by continuous contact with high temperature air during the compression process. At these high temperatures, the lubricant may suffer from oxidative breakdown. In addition, acidity, increased viscosity, and build-up of gum and varnish on internal compressor parts may result from the oxidative breakdown. The breakdown of the lubricant also reduces the useable life of the lubricant. This is a particular problem in rotary-screw compressor lubricants used for special applications such as food preparation/service industries. Lubricants for these applications are designated as grade H-1 lubricants by the USDA, and are now registered by NSF International for applications where lubricants can have the potential for incidental food contact. Such H-1 lubricants can have a very short useful life, typically 1,000-3,000 hours compared to 6,000-8,000 hours with traditional synthetic compressor lubricants. The short life is at least partly attributable to the restrictions on the types of additives that can be introduced to the lubricant.

Figure 1:
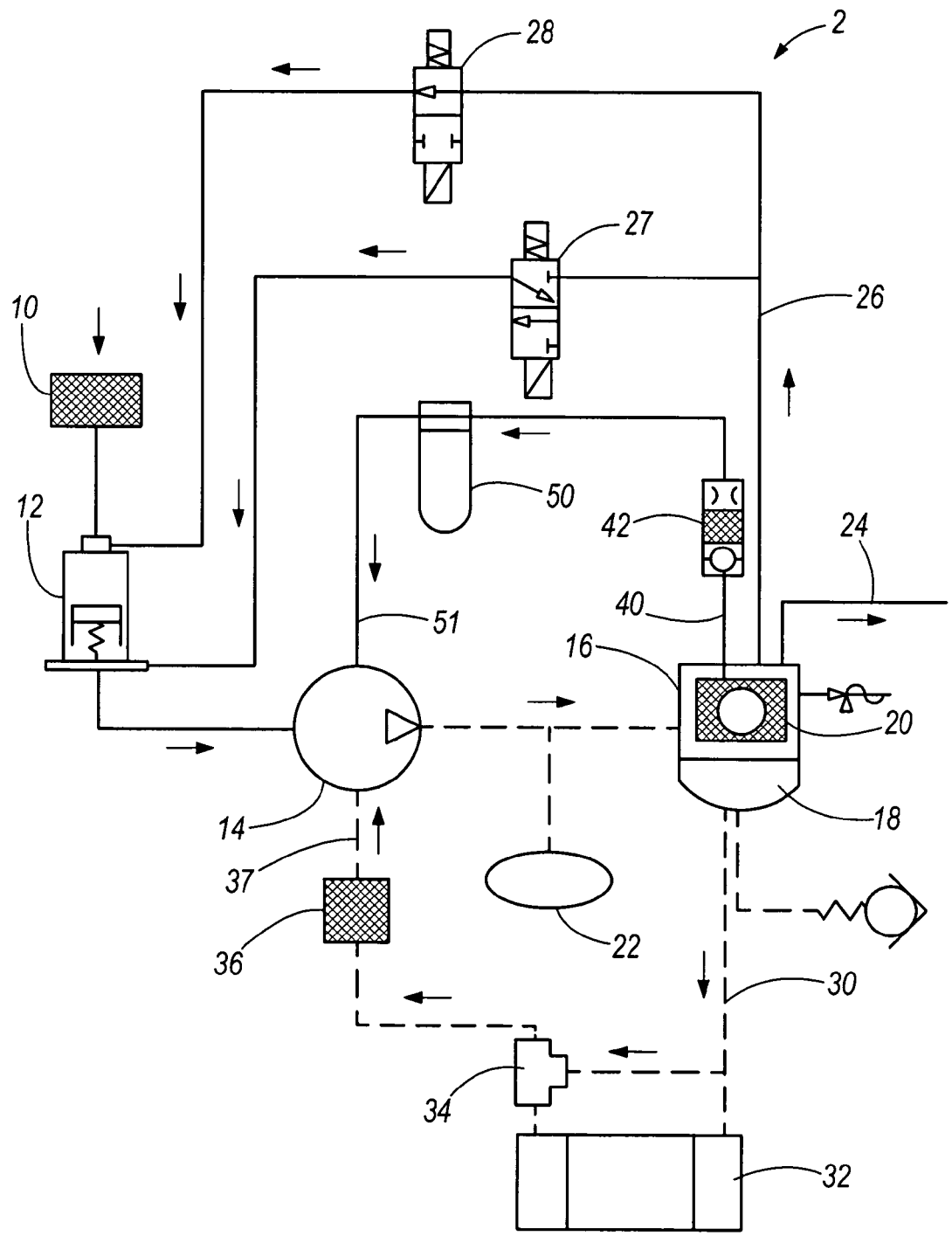
FIG. 1 is a schematic diagram of a compressor system incorporating an acid filter.

A compressor system 2 incorporating a lubricant acid filter 50 in accordance with an embodiment of the present invention is shown in FIG. 1. The compressor system 2 includes a compressor airend 14. The airend 14 as described herein includes a rotary-screw compressor. However, other types of compressor airends may also be utilized under the spirit and scope of the present invention. In some embodiments, the working fluid is air, which travels through an air filter 10 and inlet control valve 12 into the intake of the compressor airend 14. A lubricant, such as oil, is injected into the airend 14 adjacent a low-pressure end (inlet) thereof using lubricant paths 37 and 51. The air/lubricant mixture is compressed in the airend 14 and exits at high temperature and pressure through the high-pressure end (outlet) of the airend. A high air temperature switch 22 may be provided along the path just downstream of the airend outlet.

An oil cleaning system is provided downstream of the airend 14 and receives the compressed air/lubricant mixture. The oil cleaning system may include a separator to provide separation of the lubricant and the working fluid, and/or may include a particulate lubricant filter, a chemical or acid lubricant filter, and the like.

Figure 2:
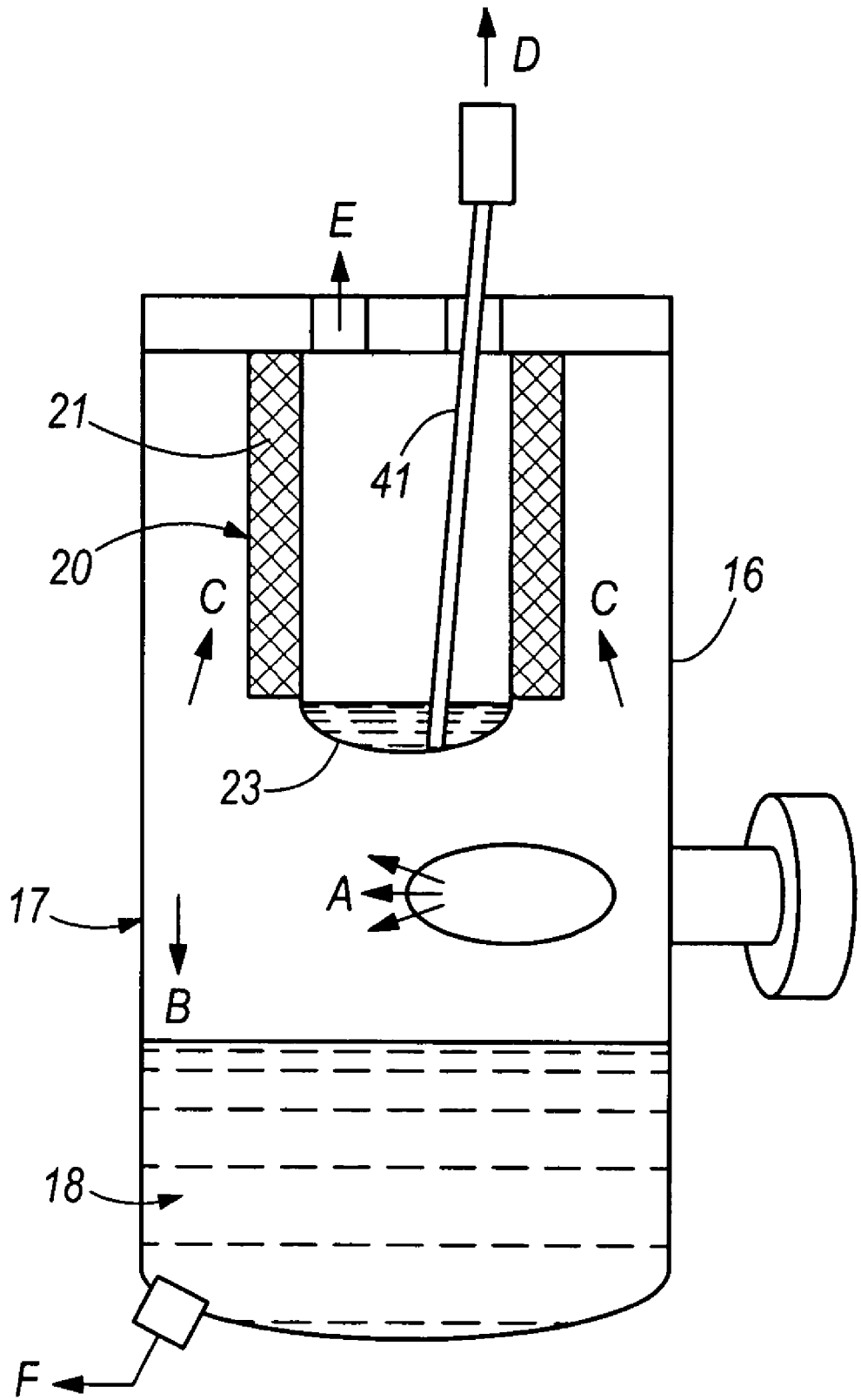
FIG. 2 is a schematic view of the separator of the compressor system of FIG. 1.

The air/lubricant mixture enters a separator tank 16 (along arrows A shown in FIG. 2) and is mechanically separated by means of a centrifugal impingement process on the inside wall of the separator tank 16. The impingement takes place at the primary separation area 17 of the separator tank 16. The separated lubricant drains down into a sump 18 of the separator tank 16. In some embodiments, a majority of the lubricant entrained in the air/lubricant mixture is removed by this primary separation process, leaving a second mixed flow having a reduced lubricant content. The partially separated air/lubricant mixture, the second mixed flow, then flows in the direction shown by the pair of arrows C to a secondary separation area that includes a separator filter 20. The separator filter 20 separates most of the remaining entrained lubricant from the air such that the air exiting the separator filter 20 is substantially "clean". In some embodiments, the separator filter 20 includes a pleated paper coalescing non-woven fiber element 21. In some embodiments, other means for separation may be employed in the secondary separation area.

The lubricant separated from the second mixed flow during the secondary separation process drains by gravity to a sump 23 positioned below the separator filter 20. The lubricant is then sent to the scavenge line 40 (in the direction of arrow D in FIG. 1) using a drop tube 41. The compressed working fluid, which is "cleaned" air in some embodiments, passes through the separator filter 20, goes out of the separator tank 16 (as shown by arrow E), and travels to downstream components, such as distribution manifolds and/or other points-of-use, through conduit 24.

Returning briefly to FIG. 1, a pressure check circuit 26 extends from the separator tank 16 to an unload valve 27. The unload valve 27 unloads the airend 14 when the pressure in the separator tank 16 is higher than a predetermined value. This effectively inhibits the compressor from providing additional air to the separator tank 16. A blowdown valve 28 may also be coupled to the separator tank 16 to provide an escape path for air when the tank pressure exceeds a predetermined value.

Referring again to FIG. 2, lubricant in the sump 18 (separated during the primary separation process) travels into a main lubricant circuit 30 as shown by arrow F of FIG. 1. The main lubricant circuit 30 includes a lubricant cooler 32. As shown in FIG. 1, the cooled lubricant from the lubricant cooler 32 travels through a thermostatic control valve 34 and a primary lubricant filter 36 before being re-injected into the airend 14 along fluid path 37. In some embodiments, the primary lubricant filter 36 is a standard filter, for example, a charcoal filter, configured to remove dirt or other contaminants from the lubricant prior to re-injection into the airend 14. Lubricant separated from the second mixed flow by the secondary separation process travels through the scavenge line 40, passes through a check valve 42, then enters the acid filter 50.

Figure 3:
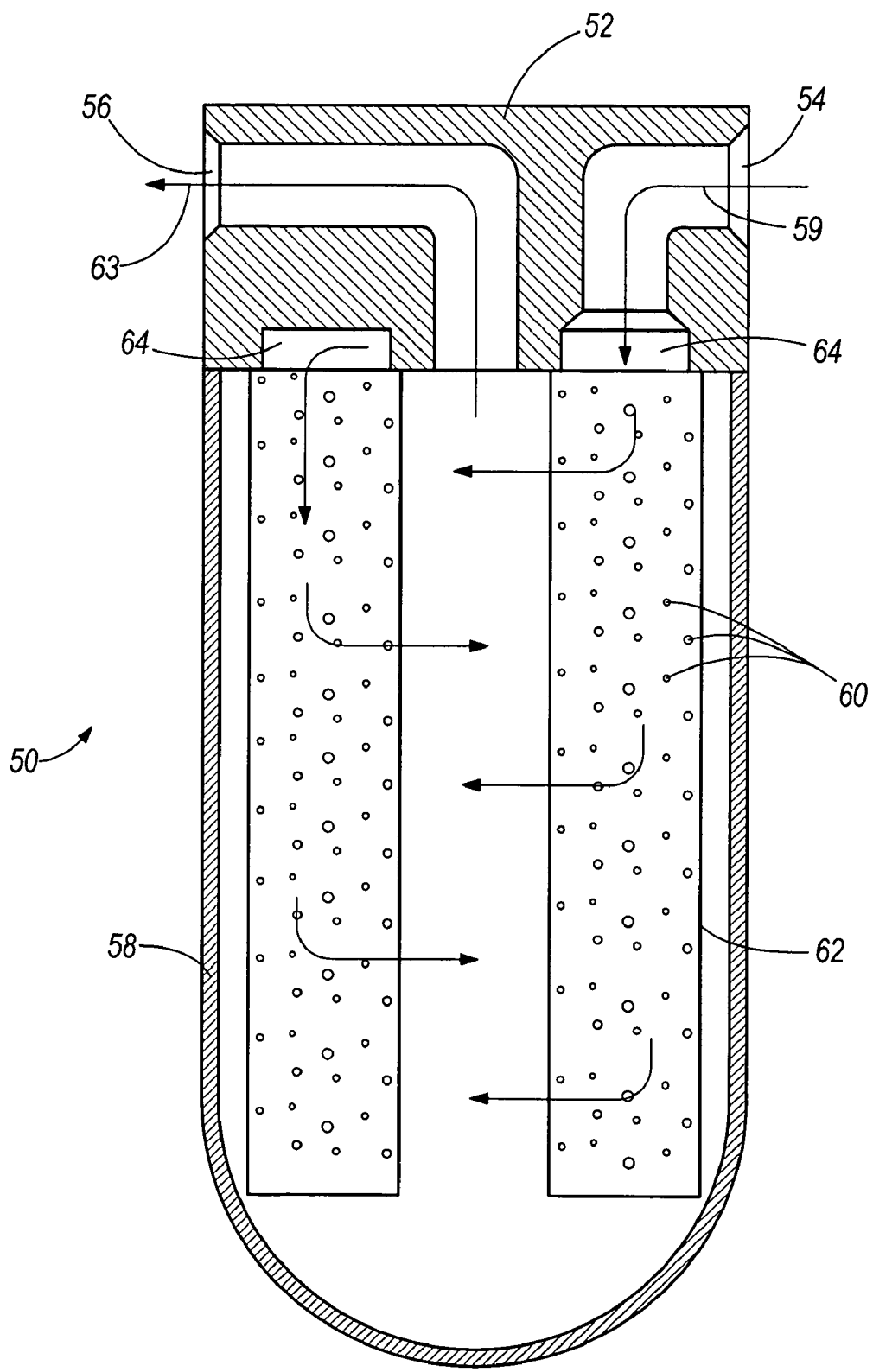
FIG. 3 is a cross-sectional view of the acid filter of the compressor system of FIG. 1.

FIG. 3 illustrates the acid filter 50 as including a filter head 52 attached to a housing 58. A filter head inlet 54 receives lubricant from the scavenge line 40 and directs the lubricant into the housing 58. Arrow 59 indicates the inward flow of lubricant through the filter head 52 and into the housing 58. An acid-absorbing resin media 60 is provided in the housing 58. The acid-absorbing resin media is contained within filter elements, such as porous filter bags 62 that may be connected to the filter head 52 or to the housing 58. After passing through the acid-absorbing resin media 60, the lubricant travels out of outlet 56 and to the airend 14 via lubricant path 51 (FIG. 1). A flow of acid-filtered lubricant exits the filter head 52 as shown by arrow 63. From the outlet 56, the flow of acid-filtered lubricant travels through lubricant path 51 to the low pressure side (inlet) of the airend 14.

In the illustrated embodiment, the filter head 52 includes an annular flow path 64. The annular flow path defines a continuous annular opening to the filter bags 62, which may also be arranged in an annular manner. In other embodiments, the annular flow path 64 may divert into separate conduits, each conduit feeding lubricant into an individual filter element. In still other embodiments, the filter head 52 does not include any annular flow paths or annular filter elements.

The acid-absorbing resin media 60 lowers the total acid number (TAN) of the lubricant by absorbing or adsorbing a portion of the acidic components contained within the lubricant. The TAN is a measure of the concentration of acidic components found in the lubricant. Applicants have found that the TAN is an indicator of remaining useful life of the lubricant and that by removing acidic components, the useful life of the lubricant can be extended. One suitable acid-absorbing resin media 60 is a macroporous ion exchange resin made up of a copolymer of styrene and devinyl benzene manufactured by Dow Chemical Company. Other acid-absorbing media may also be utilized if desired. Additionally, the invention may operate effectively with acid-reducing additives being introduced to the system lubricant at the acid filter 50.

Returning to the embodiment of FIG. 1, the scavenge line 40 is configured with the separator tank 16 such that a relatively small percentage (only the lubricant separated at the secondary separation area) of the system lubricant passes through the scavenge line 40 and the acid filter 50 during compressor system 2 operation. In some embodiments, between about 3 percent and about 10 percent of the lubricant entering the separator tank 16 flows through the secondary separation process to the acid filter 50 via scavenge line 40.

The remainder of the lubricant (between about 90 percent and about 97 percent, in some embodiments) flows out of the separator tank 16 via the main lubricant circuit 30. Thus, the two separation areas act as a lubricant flow divider, dividing the lubricant into majority and minority flows (i.e., primary and secondary flows). Assuming normal operation of a 100 horsepower (hp) rotary-screw compressor, the total volume of lubricant (approximately 30 gallons) in the compressor system 2 passes through the acid filter 50 after about 6-8 hours of operation. The portion of the system lubricant passing through the acid filter 50 exits the acid filter 50 with a lower TAN, which, when mixed with the remaining lubricant in the compressor system 2, effectively lowers the overall TAN of the total lubricant within the system. Since the TAN of the lubricant increases relatively slowly with time, the overall TAN of the lubricant can be maintained at a reduced value as compared to a system without the acid filter 50, simply through the acid filtration of the small amount of lubricant that passes through the acid filter 50.

By limiting the amount of system lubricant which flows through the acid filter 50 and providing an alternate path for lubricant to flow from the separator tank 16 to the compressor airend 14 (via main lubricant circuit 30), the pressure drop in the path from the outlet of the compressor airend 14 to the inlet remains reasonable. In some embodiments, this prevents excessive load on the airend 14, and allows the compressor to operate at an acceptable efficiency, while simultaneously holding the TAN level in check. In effect, the main lubricant circuit 30 sustains the compressor airend 14 for normal operation by providing a high volumetric flow rate of lubricant to the airend 14. The scavenge line 40 and acid filter 50 present a higher flow restriction than the main lubricant circuit 30. However, in some embodiments, only a small portion of the system lubricant between the separator tank 16 and the compressor airend 14 travels through the scavenge line 40. In some embodiments, flow division of lubricant into majority and minority flows is provided by a dedicated flow divider and operates independently of the arrangement of the air/lubricant separation.

Figure 4:
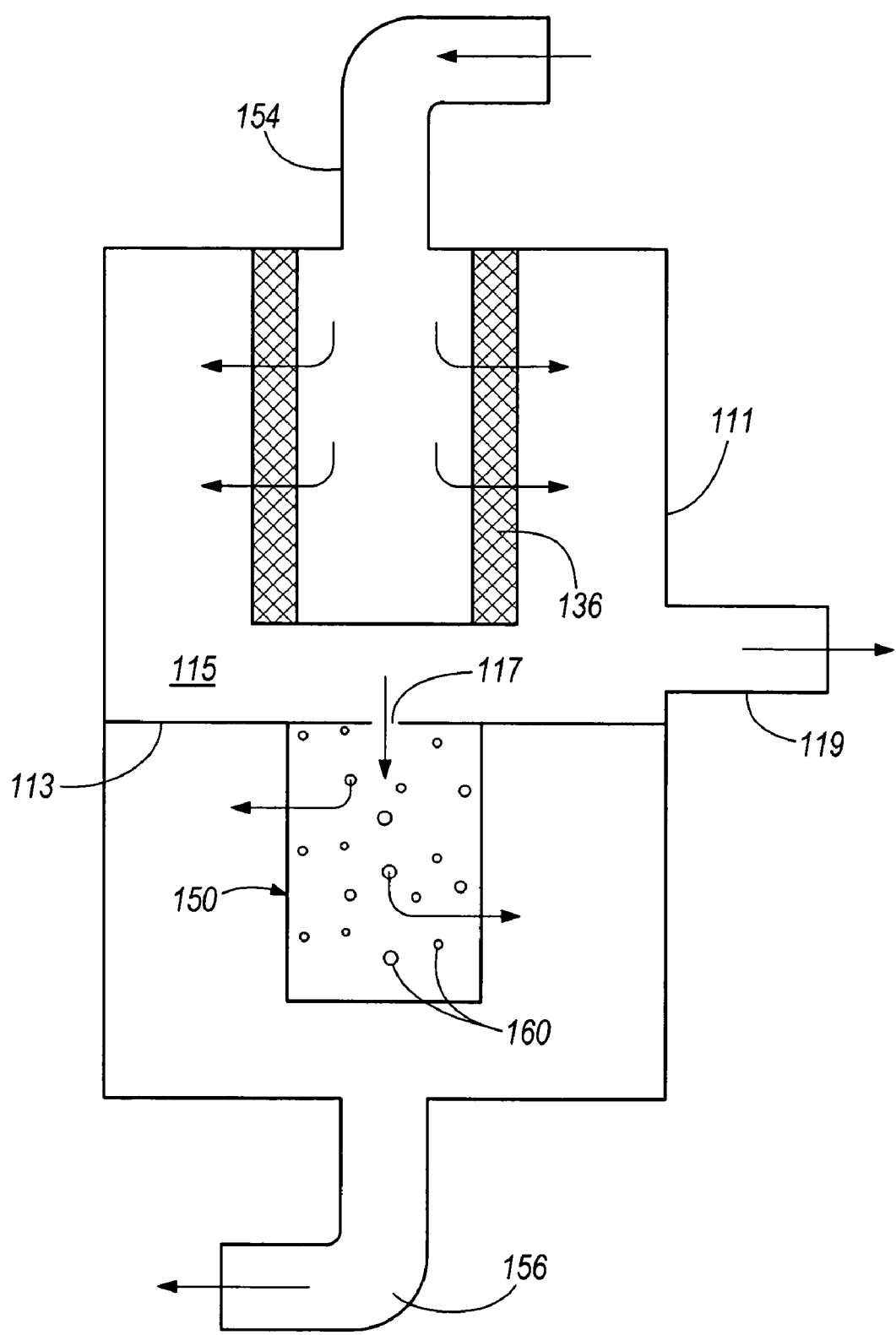
FIG. 4 is a schematic view of a combination filter.

In another embodiment, shown schematically in FIG. 4, substantially all of the lubricant separated from the air/lubricant mixture is directed to a combination filter housing 111 through the fluid inlet 154. As with previously described embodiments, a small portion of the lubricant from the separator tank 16 passes through an acid filter 150 in a given lubricant cycle. In some embodiments, between about 3 percent and about 10 percent of the lubricant from the separator tank 16 passes through the acid filter 150. The bulk of the system lubricant (in some embodiments, between about 90 percent and about 97 percent) flows from the separator tank 16 to the airend 14 without passing through the acid filter 150. The portion of lubricant that passes through the acid filter 150 flows out the fluid outlet 156, and is mixed with the bulk of the lubricant before being re-injected into the airend.

The percentage of lubricant directed through the acid filter 150 is limited by a flow divider in the form of an orifice plate 113, which divides the incoming flow into a minority flow (through a conduit of high flow resistance such as the orifice 117) and a majority flow (through a bypass outlet 119, which presents less flow resistance than the orifice 117). All of the lubricant from the separator tank 16 passes through a particulate filter 136 in the combination filter housing 111. In some embodiments, the particulate filter 136 contains charcoal or another suitable substance and filters out particulate before the lubricant flows into an intermediate chamber 115 of the combination filter housing 111.

From the intermediate chamber 115, lubricant flows either through the orifice 117 in the orifice plate 113 or through the less restrictive bypass outlet 119 into a bypass lubricant line that leads back to the airend 14. In the illustrated embodiment, the pipe cross-sectional area is used to vary the resistance to flow. Those of ordinary skill in the art will appreciate that many other methods of providing varying flow resistance are also effective. In some embodiments, an auxiliary filter and/or lubricant cooler is provided along the bypass lubricant line, similar to that shown in FIG. 1. The lubricant, which flows through the orifice 117 in the orifice plate 113 goes through the acid filter 150 to reduce the TAN of the lubricant. In some embodiments, the acid filter 150 is constructed substantially as described above with reference to FIG. 3. Acid-absorbing resin media 160 disposed within the acid filter 150 absorbs acidic compounds that are carried with the lubricant. Of course, alternate methods of reducing the TAN may be employed if desired. In the illustrated embodiment, the acid filter 150 is contained within the combination filter housing 111. In other embodiments, the acid filter 150, particulate filter 136, and flow divider are not commonly housed in the combination filter housing 111, but rather located in separated housings or partially located in separate housings. It will be apparent to those of ordinary skill in the art that a flow divider may comprise virtually any means of dividing the lubricant flow into majority and minority flows. As such, the invention should not be limited to those few examples discussed herein.

What is claimed is:

1. A compressor system comprising:
   a fluid compressor airend having an inlet and a discharge, the fluid compressor airend operable to discharge a working fluid and lubricant mixture at a higher pressure from the discharge;
   a separator in fluid communication with the discharge, the separator configured to separate lubricant from the working fluid and lubricant mixture, the separator including a primary separation area and a secondary separation area, a first portion of the lubricant being separated from the working fluid in the primary separation area, and a non-zero second portion of the lubricant being separated from the working fluid at the secondary separation area, the majority of the lubricant being separated in the primary separation area and directed along a first flow path, the second portion of the lubricant directed along a second flow path;
   an acid filter positioned along the second flow path, the acid filter including a filter housing containing an acid-absorbing resin media arranged in a cylindrical shape having a central opening; and
   a filter head including a single continuous annular inlet opening formed as part of the filter head and positioned adjacent the resin media and a circular outlet disposed adjacent the central opening, the filter head configured to direct the lubricant into the resin media via the annular inlet opening and to collect the lubricant from the resin media via the central opening.

2. The compressor system of claim 1, wherein less than about 10 percent of the lubricant follows the second flow path.

3. The compressor system of claim 1, wherein the secondary separation area includes a lubricant separator filter, which is in fluid communication with the second flow path.

4. The compressor system of claim 1, wherein the primary separation area includes a sump near the bottom of the separator which serves as a gravity-fed collection area for lubricant separated from the working fluid and lubricant mixture at the primary separation area.

5. The compressor system of claim 1, wherein the primary separation area is configured to separate a majority of the lubricant from the working fluid and lubricant mixture such that a majority of the compressor system lubricant passes through the first flow path.

6. The compressor system of claim 5, wherein the amount of lubricant passing through the first flow path is between about 90 percent and about 97 percent of the lubricant flowing between the separator and the inlet of the compressor airend.

7. The compressor system of claim 1, wherein the acid-absorbing resin media consists of a macroporous ion exchange resin made up of a copolymer of styrene and devinyl benzene.

8. The compressor system of claim 1, wherein the acid-absorbing resin media is contained in a plurality of porous filter bags.

9. The compressor system of claim 1, wherein the first flow path includes a lubricant cooler and a lubricant filter.

10. A compressor system comprising:
a fluid compressor airend having an inlet and a discharge, the fluid compressor airend operable to discharge a working fluid and lubricant mixture at a higher pressure from the discharge;
a separator in fluid communication with the discharge, the separator configured to separate lubricant from the working fluid and lubricant mixture, the separator including a primary separation area and a secondary separation area, a first portion of the lubricant being separated from the working fluid in the primary separation area, and a non-zero second portion of the lubricant being separated from the working fluid at the secondary separation area, the majority of the lubricant being separated in the primary separation area and directed along a first flow path, the second portion of the lubricant directed along a second flow path;
an acid filter positioned along the second flow path, the acid filter including a filter housing containing an acid-absorbing resin media arranged in a cylindrical shape having a central opening; and
a filter head including a continuous annular inlet opening formed as part of the filter head and positioned adjacent the resin media and a circular outlet disposed adjacent the central opening, the annular inlet opening surrounding the circular outlet, the filter head configured to direct the lubricant into the resin media via the annular inlet opening and to collect the lubricant from the resin media via the central opening.

* * * * *